United States Patent [19]
Glenn et al.

[11] 3,842,727
[45] Oct. 22, 1974

[54] FRUIT SLICING APPARATUS

[75] Inventors: John G. Glenn, Cucamonga; Walter Ziegler, Riverside; Ned C. Carter, Chino, all of Calif.

[73] Assignee: Sunkist Growers, Inc., Sherman Oaks, Calif.

[22] Filed: Dec. 6, 1971

[21] Appl. No.: 204,957

[52] U.S. Cl............... 99/592, 53/123, 99/484, 99/543, 99/549
[51] Int. Cl....... A23n 7/08, A23p 1/00, A47j 17/16
[58] Field of Search........... 99/233.11, 233.12, 549, 99/550, 543, 591, 592, 484; 53/123

[56] References Cited
UNITED STATES PATENTS

| | | | |
|---|---|---|---|
| 1,415,458 | 5/1922 | Lewis | 99/543 |
| 1,430,124 | 9/1922 | Stanley | 99/543 X |
| 1,489,034 | 4/1924 | Johnson | 99/543 X |
| 1,817,967 | 8/1931 | Coons | 99/233.12 |
| 2,178,884 | 11/1939 | Thompson | 53/123 |
| 2,602,480 | 7/1952 | Taylor | 99/591 |
| 2,693,210 | 11/1954 | Gustafson | 99/543 X |
| 3,236,276 | 2/1966 | Farmer | 99/233.12 |
| 3,246,678 | 4/1966 | Farmer | 99/543 |
| 3,753,397 | 8/1973 | Shrewsbury | 99/538 X |

FOREIGN PATENTS OR APPLICATIONS
143,306   12/1961   U.S.S.R............... 99/484

*Primary Examiner*—Wayne A. Morse, Jr.
*Attorney, Agent, or Firm*—Paul A. Weilein

[57] ABSTRACT

Successive oranges are forced axially against a rotating cylindrical knive to produce solid cylindrical cores of fruit pulp with skin caps at each of their opposite ends and to produce skin-laden sleeves which are discarded. The pulp cores are then cut transversely by a set of parallel knives to produce a stack of fruit slices with severed skin-laden caps at each end of the stack. Finally, the severed caps are discarded to leave the skin-free slices of fruit pulp.

30 Claims, 18 Drawing Figures

INVENTORS.
JOHN G. GLENN
WALTER ZIEGLER
BY NED C. CARTER

ATTORNEY

INVENTORS.
JOHN G. GLENN
WALTER ZIEGLER
BY NED C. CARTER

Paul A. Weilein
ATTORNEY

FRUIT SLICING APPARATUS

BACKGROUND OF THE INVENTION

Orange slices free from skin are served in various ways in restaurants but it is too expensive to attempt to satisfy the potential demand by slicing oranges by hand. The potential demand can be met, however, by employing slicing machines to produce the slices in quantity and then freezing suitable trays of the fruit slices for distribution among restaurants.

It has been found that a satisfactory and economical procedure for producing fruit slices in quantity is to cause a cylindrical knife to pass through each fruit axially to produce a skin-laden outer sleeve that is discarded and to produce an axial core of pulp with skin caps at the opposite ends of the core. The fruit core is then cut transversely by a set of parallel knives to result in a stack of the fruit slices with skin-laden caps at each end of the stack. Discarding the skin-laden caps leaves the desired fruit slices.

It is old in the art to carry out some of these steps to produce slices of fruit, including pineapple slices, as evidenced by the Smythe U.S. Pat. No. 995,491, the Lewis Pat. No. 1,415,458, the Farmer Pat. No. 3,036,920, and the Sawyer, Jr. Pat. No. 3,073,366. Thus, it is old broadly to employ a cylindrical knife to produce an axial fruit core which is then sliced transversely. None of these prior art devices, however, is suitable for automatically producing orange slices at a high production rate and none teaches solutions to certain problems that are peculiar to the handling and slicing or oranges.

SUMMARY OF THE INVENTION

A continuously rotating upright support structure of the character of a carousel or turntable has a plurality of stations at which the series of steps of an operating cycle are carried out in sequence, the fruit at the different stations being at different stages of the operating cycle at any given moment. Thus, each rotation of the carousel processes as many fruit as there are stations on the carousel.

In the presently preferred embodiment of the invention the rotary upright support structure or carousel has four vertically spaced decks with moving parts of the mechanism of each station operating on all four decks. The second deck from the top is the receiving deck on which the fruit is initially deposited and the third deck is the coring deck where the axial cores of fruit pulp are cut from the newly received fruit. The fourth deck is the slicing deck where the axial cores are cut into slices by a plurality of parallel knife blades. The top deck may be termed the plunger deck because it carries a plurality of plungers corresponding to the plurality of stations, which plungers advance downwardly in timed sequence to force the fruit from the receiving deck to the coring deck and to force the axial cores from the coring deck to the lowermost slicing deck.

The receiving deck has receiving rings at each of the various stations and each orange that is to be processed is placed in a receiving ring as the receiving ring passes an operator at a loading zone. The newly placed fruit is enclosed by the receiving ring on the receiving deck with the fruit contiguous to the upper end of a rotating circular knife on the coring deck just below the receiving deck. The lower end of the circular knife on the coring deck is open to permit an axial core of fruit inside the circular knife to be forced downward to the slicing deck that is immediately below the coring deck.

When a receiving ring moves beyond the loading zone a corresponding vertical plunger descends from the top deck and advances successively through the receiving ring, and through the rotating circular knife below the receiving ring. The cutting action of the cylindrical knife divides the fruit into an outer skin-laden sleeve and an inner axial core fo fruit pulp with skin-laden opposite ends. Mechanism associated with the rotating cylindrical knife severs the outer circumferential skin-laden sleeve to produce a skin-laden cuff that may be readily separated from the core and this cuff is discarded as the plunger continues to advance downward to push the axial fruit core from the interior of the cylindrical knife into a slotted holder or cage on the lowermost slicing deck. A plurality of parallel knife blades enter the slots of the cage to cut the fruit core into a stack of fruit slices with skin-laden caps at the upper and lower ends of the stack. The two skin-laden caps are separated from each stack and discarded to leave the desired stack of skin-free slices of fruit pulp which are then discharged into a suitable conveyor. Preferably, the fruit slices are bisected by disc-shaped knives as the fruit slices are carried away by the discharge conveyor.

The features and advantages of the invention may be understood from the following detailed description and the accompanying drawings.

BRIEF DESCRIPTION OF THE DRAWINGS

In the drawings which are to be regarded as merely illustrative.

DESCRIPTION OF THE PREFERRED EMBODIMENT OF THE INVENTION

General Arrangement

Figure 1:
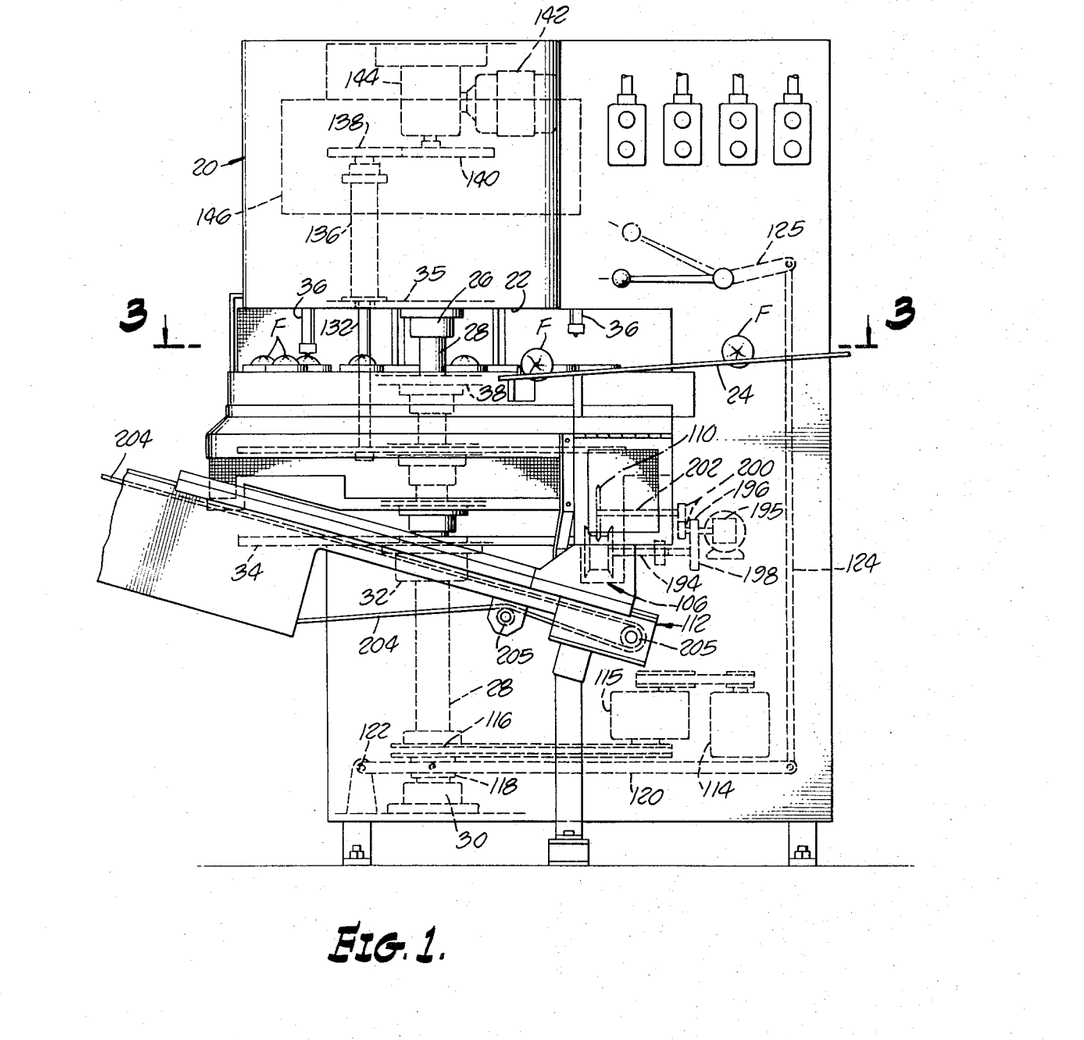
FIG. 1 is a front elevation of the presently preferred embodiment of the invention.

As shown in FIG. 1 the principal moving parts of the apparatus are enclosed by an upright housing 20 having a window 22 at a loading zone where successive fruit F are fed to the apparatus. Successive fruit F to be processed are delivered from a suitable supply (not shown) to an inclined runway 24 which forms a supply row of the fruit from which an operator feeds the successive fruit to the apparatus through the window 22. The housing 20 encloses an upright carousel or rotary support structure, generally designated 25, which comprises a plurality of vertically spaced decks mounted on an upright support shaft 28, the shaft being mounted on a lower thrust bearing 30 and extending upward through a ball bearing 32 on a fixed platform 34. The carousel 25 has ten circumferentially spaced processing stations each of which carries out a complete slicing operation in the course of one revolution of the carousel and the processing mechanism at each station is distributed over four levels of the carousel.

Figure 4:
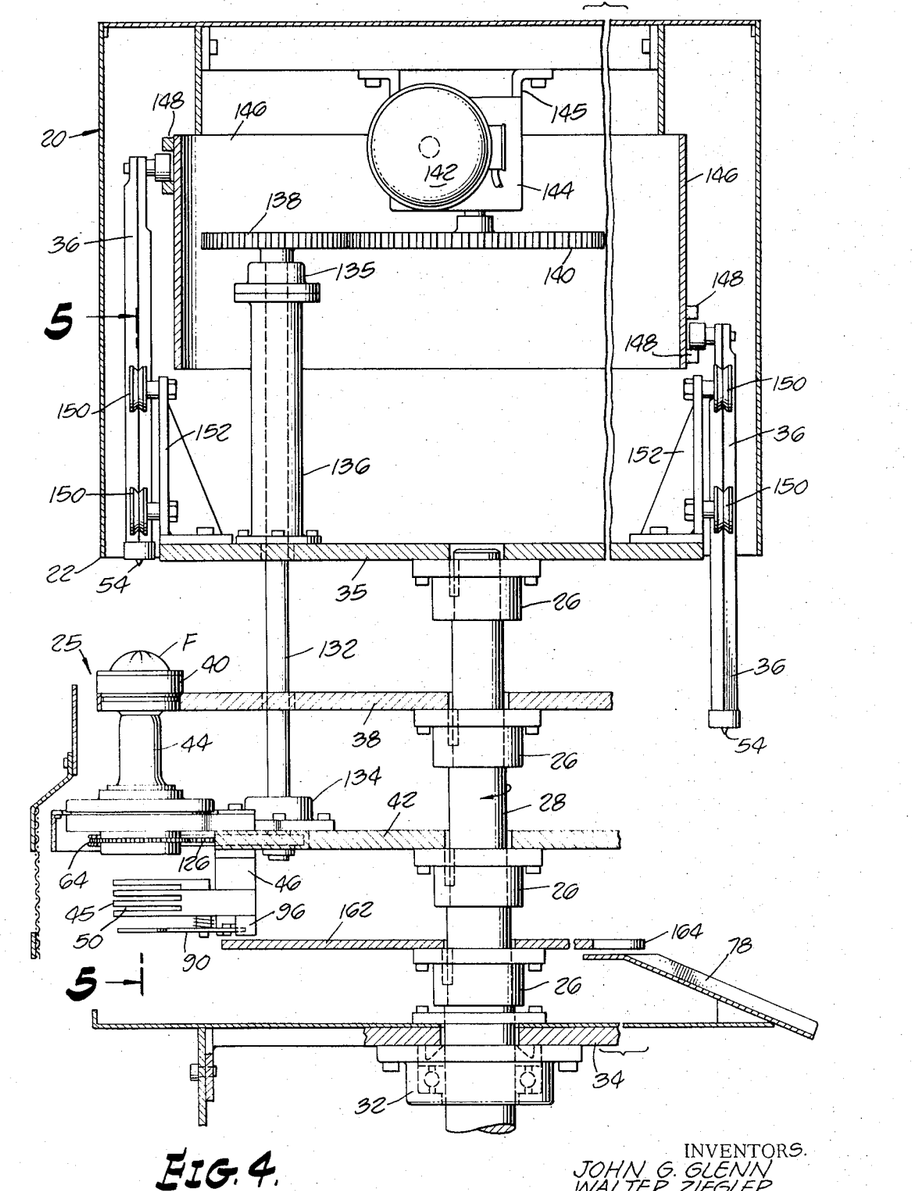
FIG. 4 is an axial section taken as indicated by the line 4—4 of FIG. 3.
Figure 9:
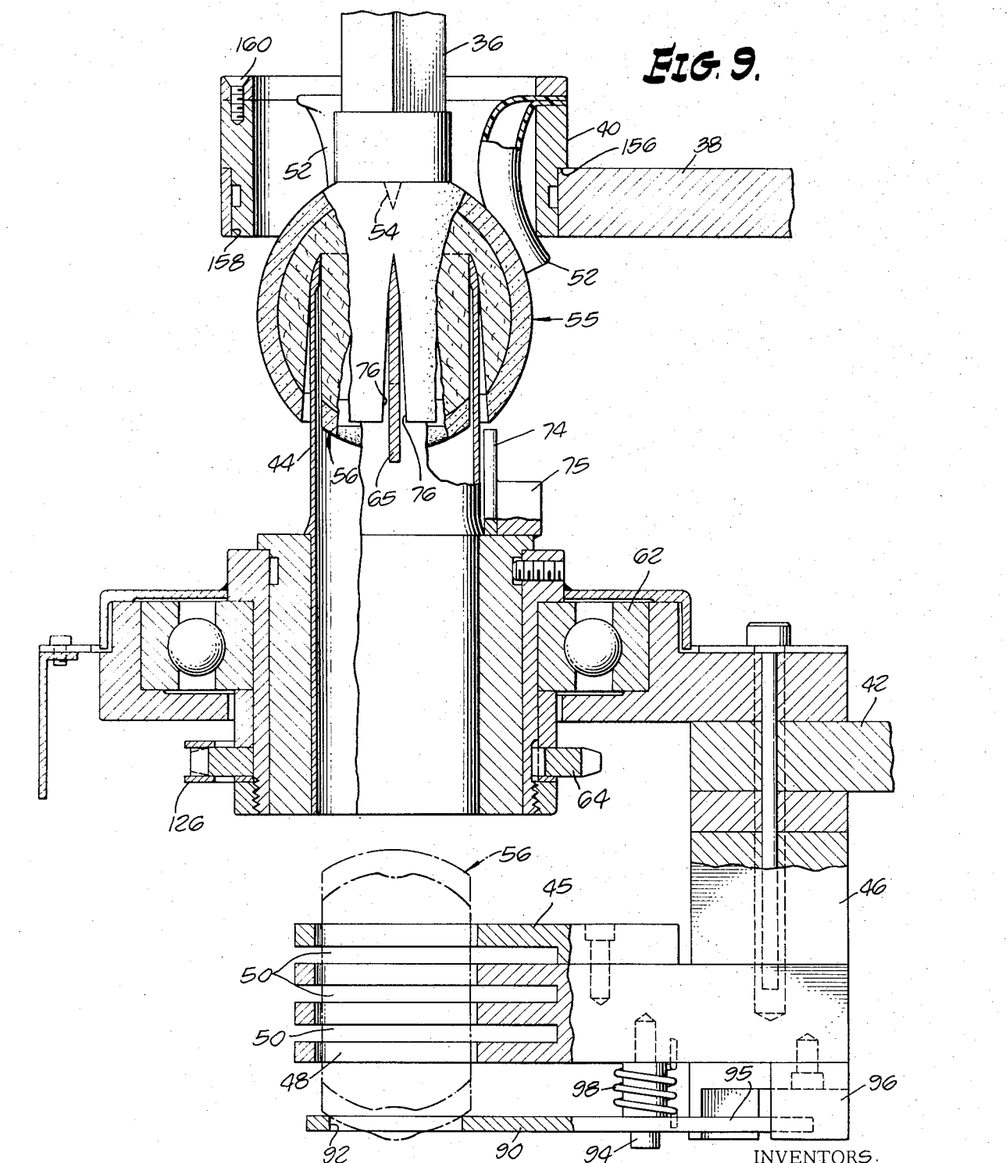
FIG. 9 is an enlarged vertical section taken along the line 9—9 of FIG. 5 showing a plunger pushing an orange onto a rotating cylindrical knife.

Referring to FIG. 4, the uppermost deck 35 may be termed the plunger deck since it provided ten plungers 36 at the ten operating stations for forcing the fruit downward through lower decks. The second deck 38 is the receiving deck that is provided with the receiving rings 40 in which the operator places successive fruit F taken from the runway 24. The third deck 42 may be termed the coring deck because it is equipped with ten cylindrical knives 44 to cut cores of pulp from the successive fruit, each knife being open both at the top and the bottom. The fourth or lowermost operating level is provided by ten holders or cages 45 which are suspended by brackets 46 from the coring deck 42. As best shown in FIG. 9, each of the cages 45 has an upright passage 48 and the cage is formed with a plurality of slots 50 which intersect the passage.

Figures 5, 7, 8:
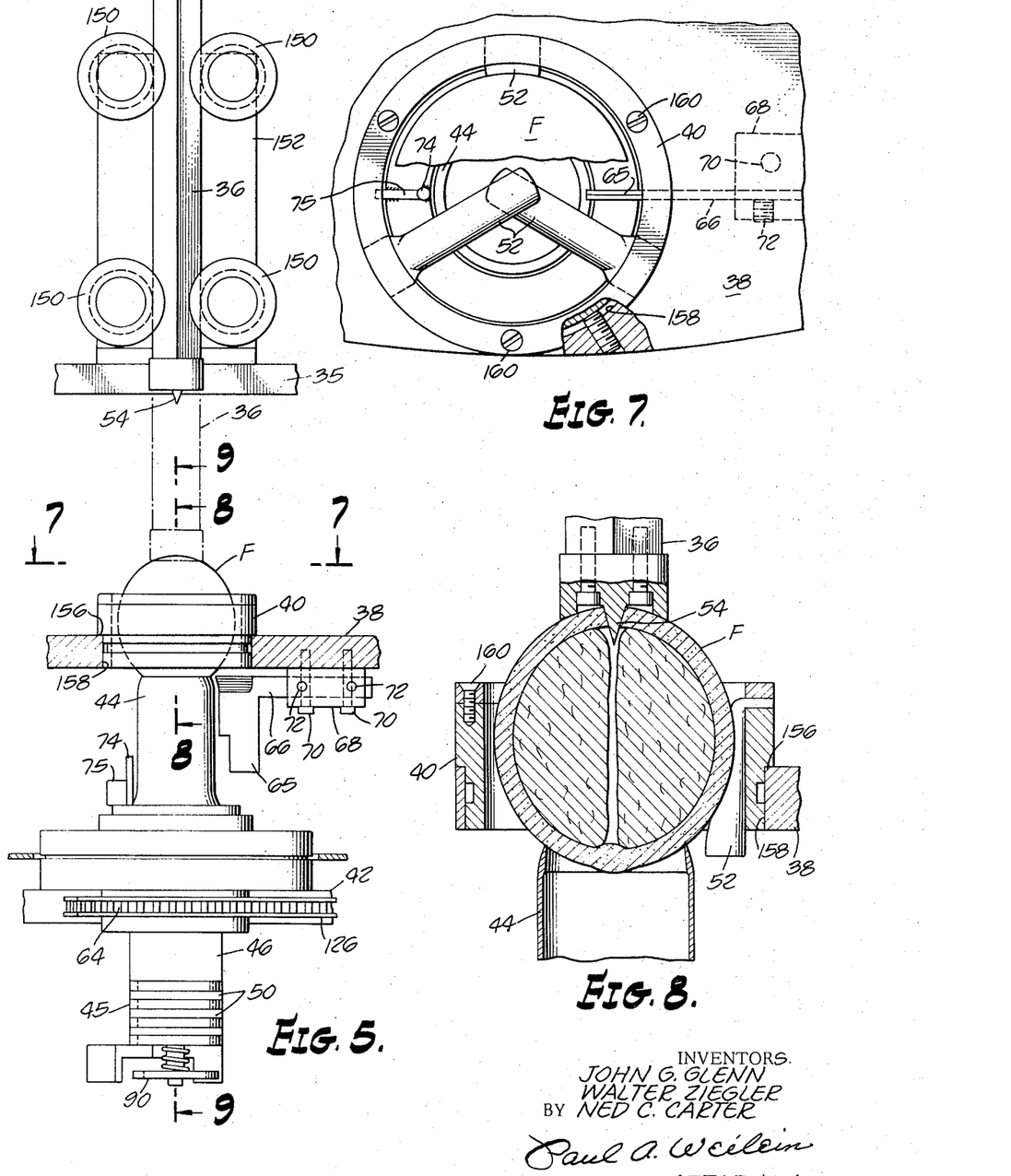
FIG. 5 is an enlarged vertical section taken as indicated by the line 5—5 of FIG. 4.
FIG. 7 is an enlarged fragmentary plan view as seen along the line 7—7 of FIG. 5.
FIG. 8 is an enlarged vertical section taken along the line 8—8 of FIG. 5.

Each of the ten receiving rings 40 is provided with radially inwardly directed flexible plastic fingers 52 shown in FIGS. 7 and 9 which cooperate to center a fruit in the ring and to accommodate fruit of different diameters. A newly received fruit is positioned in a receiving ring 40 with the axis of the fruit vertical, as shown in FIG. 8, and with the fruit resting on the upper cutting end of the corresponding cylindrical knife 44.

Figure 10:
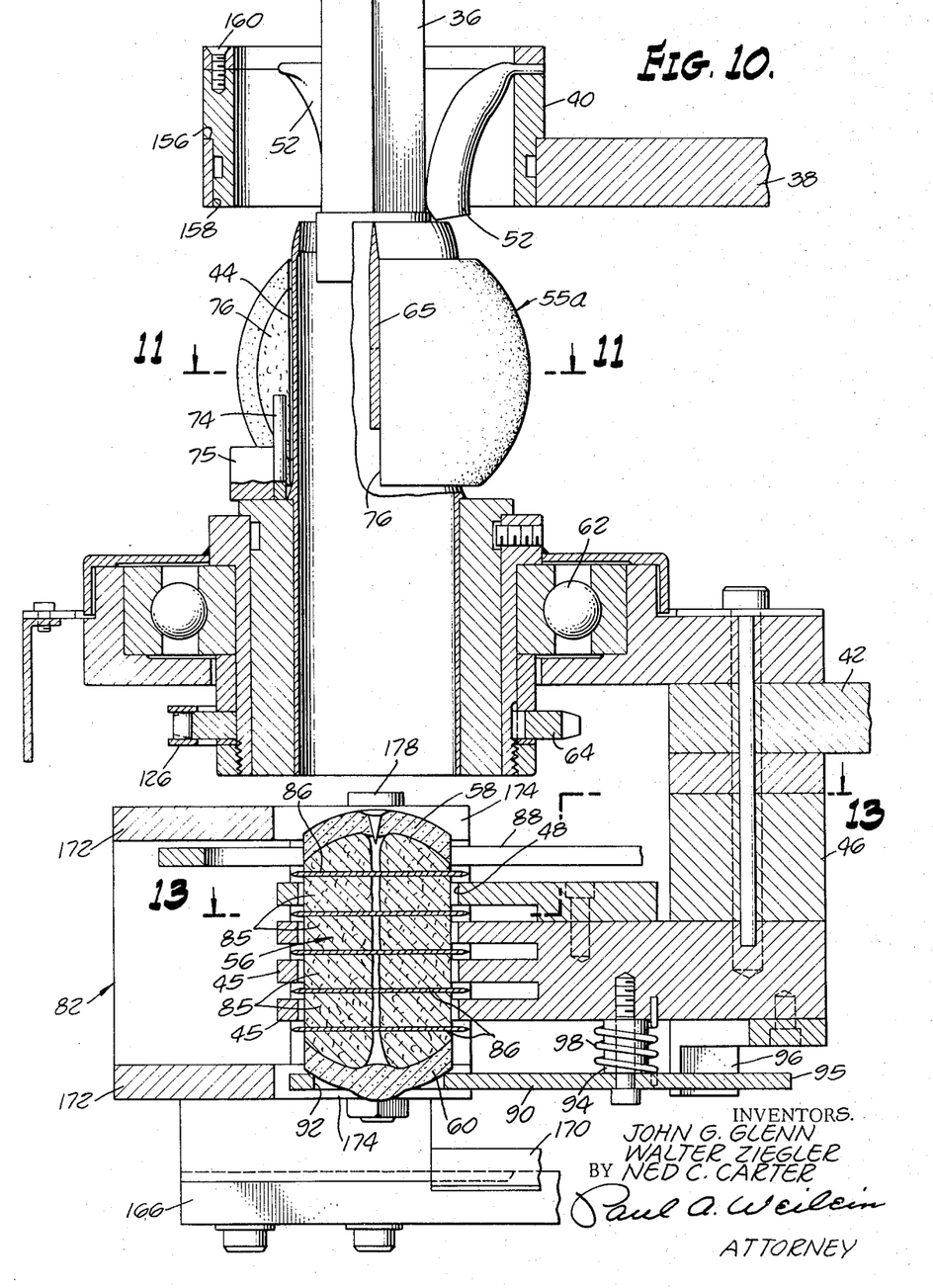
FIG. 10 is an enlarged vertical section taken along the line 10—10 of FIG. 6 and is similar to FIG. 9 with the plunger advanced far enough to divide an orange into an axial core and an outer sleeve.

As indicated in FIG. 5, a plunger 36 having a small spike 54 on its leading end moves longitudinally downward against a fruit in a receiving ring 40 and forces the newly received fruit downward onto the cylindrical knife in a manner shown in FIGS. 9 and 10 to divide the fruit into an outer skin-laden sleeve 55 and an inner axial core 56 of pulp, which core, as shown in FIG. 10, has an upper skin cap 58 and a lower skin cap 60. The outer skin-laden sleeve 55 of the fruit stops at the level of the cylindrical knife, as shown in FIG. 10, but the plunger 36 continues downward to force the axial core through the cylindrical knife and into the corresponding cage 45 below the knife, the downwardly displaced axial core 56 being shown in phantom in FIG. 9. Each cylindrical knife 44 is journalled in a corresponding ball bearing 62 and each cylindrical knife is provided with a sprocket 64 by means of which it is continuously rotated on its axis.

As shown in FIG. 5, a fixed, straight, upright knife blade 65 adjacent the periphery of each of the cylindrical knives has a horizontal shank 66 by means of which it is adjustably mounted in a bracket 68 on the underside of the receiving deck 38. The bracket is anchored by a pair of screws 70 and is provided with a pair of set screws 72 which may be loosened to permit adjustment of the knife blade. As also shown in FIG. 5, each rotary cylindrical knife 44 carries an upright pin 74 adjacent its periphery which is moved in an orbit by the knife and which is provided with a small wing 75, and the upright knife blade 65 is cut away as shown to clear the orbitally moving pin and wing.

Figure 2:
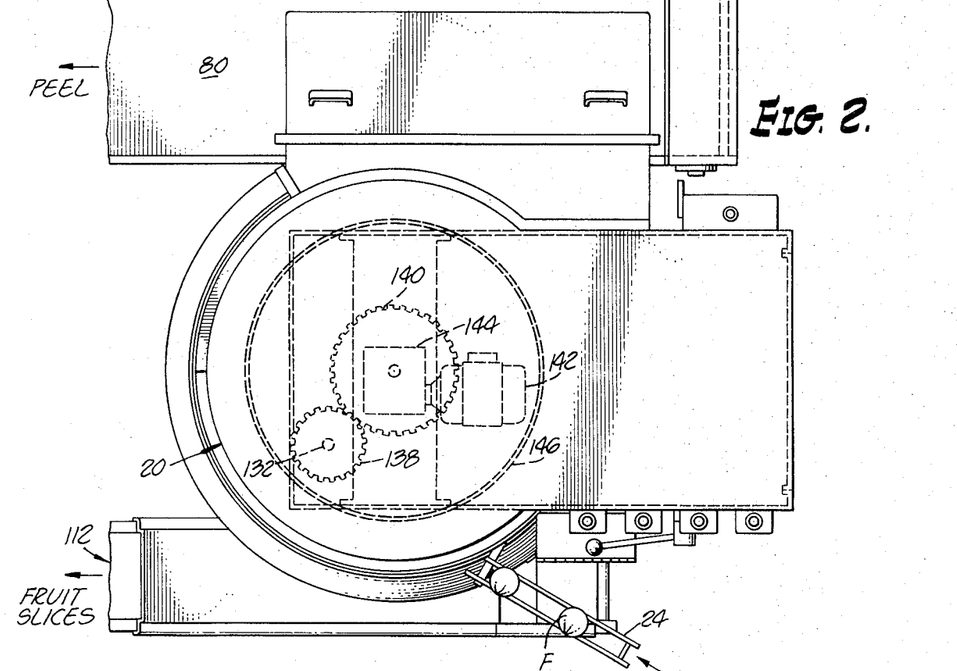
FIG. 2 is a plan view of the embodiment.
Figure 11:
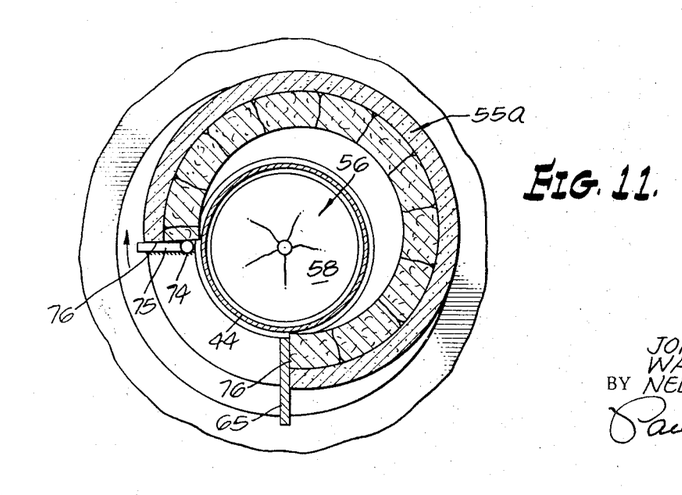
FIG. 11 is a fragmentary horizontal section taken along the line 11—11 of FIG. 10 showing how means associated with the rotary cylindrical knife cuts a skin-laden cylindrical fruit sleeve to form a split cuff that is discarded.

When a fruit is forced downward onto a cylindrical knife 44 to divide the fruit into an outer skin-laden sleeve 55 and an inner axial core 56, the stationary knife blade 65 splits the outer sleeve as indicated in FIG. 10 to convert the sleeve into a cuff 55a having two confronting end faces 76. One of the end faces 76 remains in abutment with the upright knife blade 65, as shown in FIG. 10, but the orbitally moving pin 74 and its wing 75 abut the other end face 76 of the cuff to cause the cuff to be expanded and discharged laterally from the rotating cylindrical knife in the general manner that is indicated by FIG. 11. Each discarded cuff 55a is acted upon by centrifugal force and eventually slides off the edge of the deck 42 through an opening in the housing onto a ramp or chute 78 (FIGS. 4, 6, and 16) which leads to a discard conveyor 80 that is best shown in FIG. 2 and which carries away the peel or skin of the processed fruit.

Figure 6:
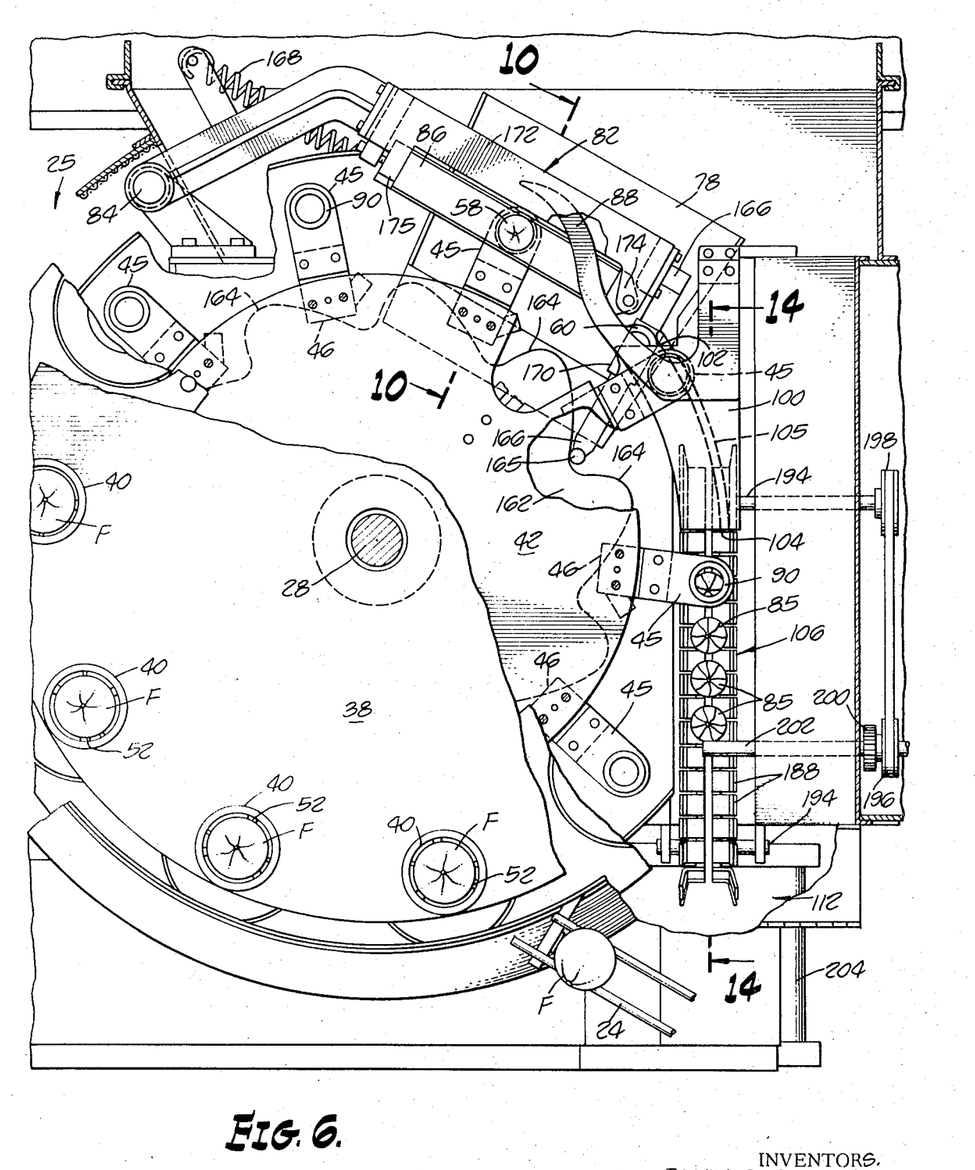
FIG. 6 is a horizontal sectional view with parts broken away to show portions of the various decks.
Figures 12, 13:
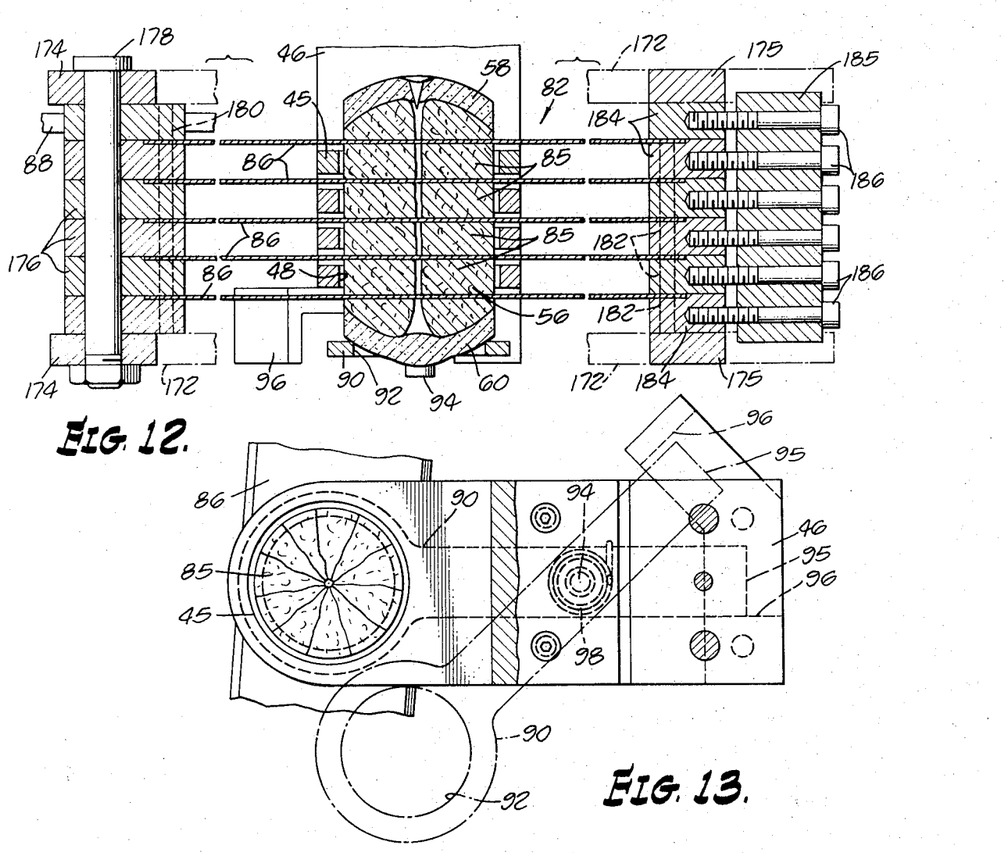
FIG. 12 is a fragmentary vertical section taken along the line 12—12 of FIG. 16 and showing how the parallel blades cooperate with the slotted cage to cut an axial fruit core into a stack of slices.
FIG. 13 ia a fragmentary sectional view taken along the line 13—13 of FIG. 10 showing a slotted cage in plan view.

As shown in FIG. 6, a slicing zone adjacent the periphery of the rotating carousel is provided with a multiple blade knife assembly, generally designated 82, which is mounted on a fixed pivot 84 and oscillates in synchronism with the rotation of the carousel to cut the successive axial fruit cores 56 in the slotted cages 45 into stacks of slices. Each stack, as indicated in FIGS. 10 and 12, comprises an uppermost skinladen cap slice 58, a lower skin-laden cap slice 60, and four intermediate skin-free pulp slices 85. The uppermost cap slice 58 rests on the uppermost blade 86 of the knife assembly and is carried away by the blade until the retracting blade carries the cap slice against a curved finger 88 (FIGS. 6, 10, 14, 14a and 16) that is fixedly mounted adjacent the carousel and serves as a cam to dislodge the upper cap slice 58 from the blade onto the previously mentioned chute 78 that leads to the discard conveyor 80.

As shown in FIG. 9, each cage 45 is provided with a lower support means 90 having a circular aperture 92 to seat the lower end of a newly received fruit core 56 and this lower support means is adapted to retract out of alignment with the cage for the dual purpose of discarding the lower cap slice 60 and of clearing the lower end of the cage passage 48 to permit the intermediate skin-free slices 85 of fruit pulp to drop out of the bottom of the cage.

The lower support means 90 is in the form of a lever that is mounted on a pivot 94 to swing to a retracted position that is shown in phantom in FIG. 13. The lever 90 has a short arm 95 that abuts a stop 96 on the underside of the cage bracket 46 at the normal effective position of the level, the lever being biased towards this normal position by a torque spring 98.

Figure 16:
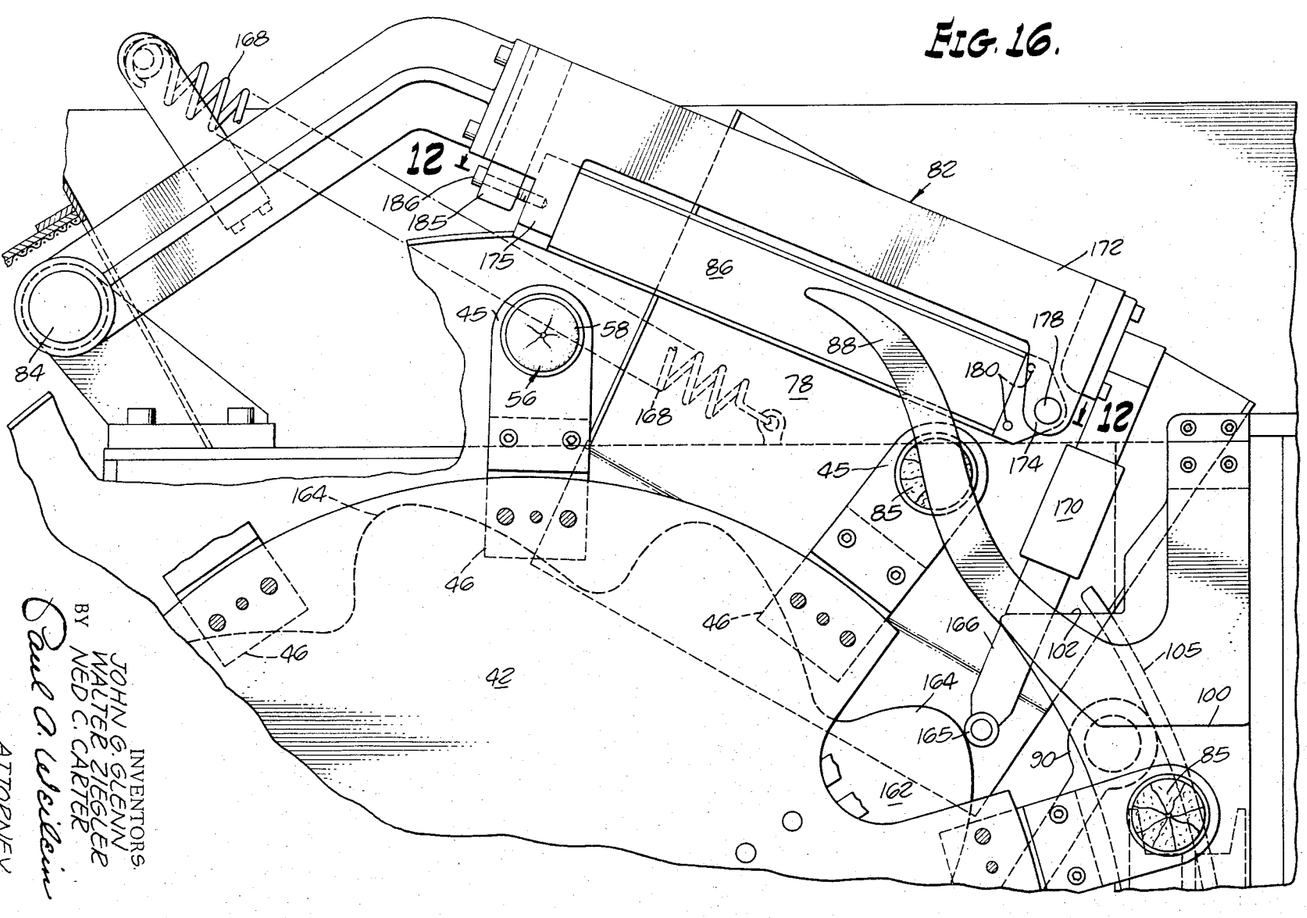
FIG. 16 is a fragmentary plan view similar to FIG. 6 showing the knife assembly mounted adjacent the carousel to cooperate with the successive slotted cages of the lowest deck of the carousel.

As each cage 45 moves away from the slicing zone it passes over the upper surface of a fixed plate 100 which, as shown in FIGS. 6 and 16, has a leading edge 102 and as shown in FIG. 16 has a trailing edge 104. As each cage 45 approaches the leading edge 102 of the fixed plate 100, the outer end of the pivoted lower support means 90 encounters a fixed curved deflector 105 (FIGS. 6 and 16) which cams the lower support means 90 to its retracted position shown in phantom in FIG. 13 thereby carrying the lower cap slice 60 of the fruit away from the stack of slices to permit the remaining stack of the intermediate pulp slices 85 to drop onto the upper surface of the fixed plate 100 and to permit the travelling cage 45 to slide the stack of intermediate pulp slices along the plate 100 until the stack reaches the trailing edge 104 of the plate and then drops out of the cage onto a short conveyor that is generally designated by numeral 106 in FIGS. 1, 3, 6, 14, and 15. In the meantime, the travelling retracted lower support means 90 carries the lower cap slice 60 of the fruit into abutment against the leading edge 102 of the fixed plate 100 to cause the lower cap slice to be dislodged from its seat on the lower support means whereupon the dislodged lower cap slice falls onto the previously mentioned chute 78 which directs it onto the discard conveyor 80.

Figures 14, 14A, 15:
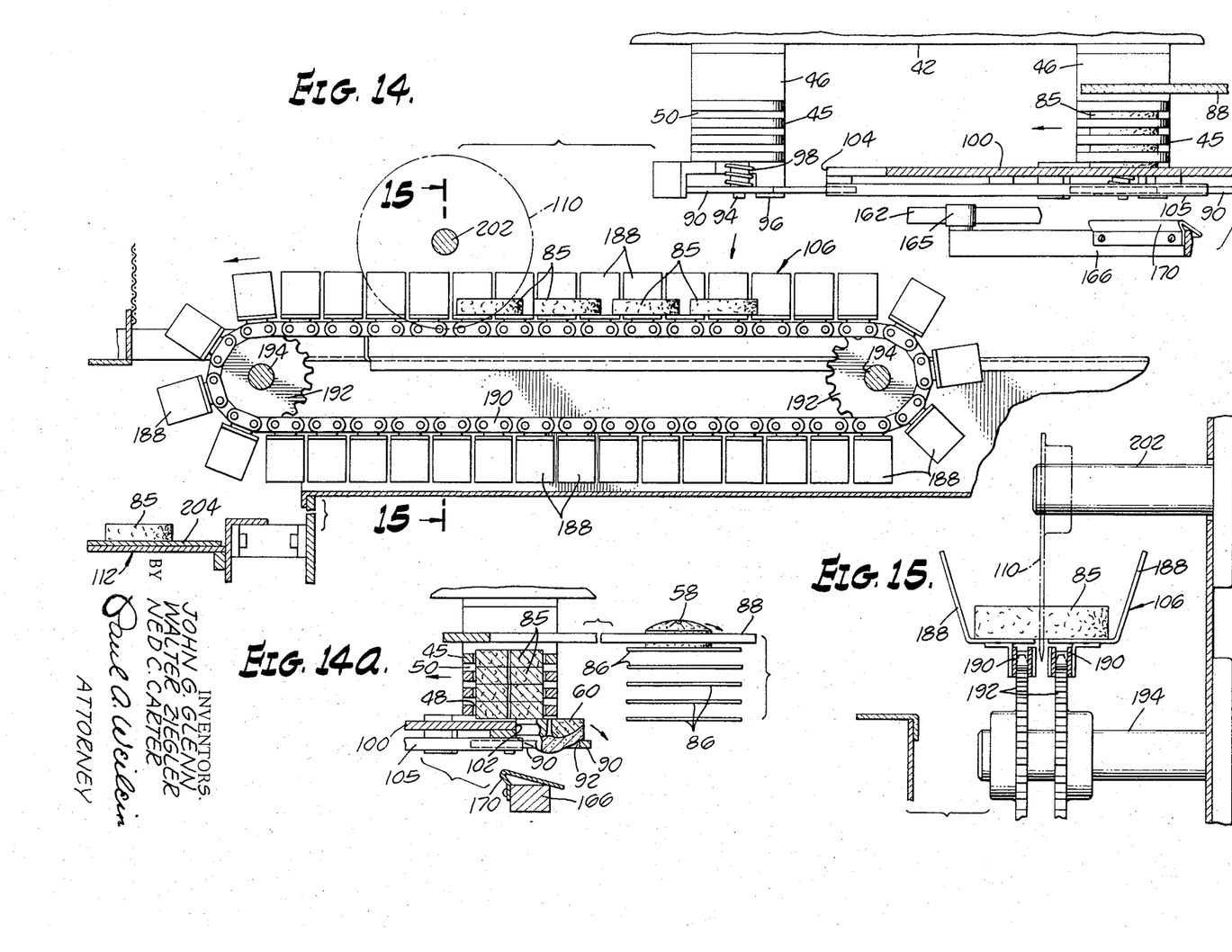
FIG. 14 is an enlarged sectional view as seen along the line 14—14 of FIG. 6 showing how a short conveyor is related to the lowermost deck of the carousel.
FIG. 14a is a fragmentary sectional view showing how a skin-laden cap at the upper end of a stack of fruit slices is discarded by a stationary curved finger.
FIG. 15 is an enlarged vertical section taken as indicated along the line 15—15 of FIG. 14 showing how a rotary knife blade may cooperate with the short conveyor to bisect the slices of fruit pulp.

Preferably, a power driven disc-shaped blade 110 that is shown in phantom in FIGS. 1 and 15 is provided to bisect the pulp slices 85 as they are carried along the short conveyor 106. The short conveyor 106 drops the bisected fruit pulp slices 85 onto a discahrge conveyor that is generally designated 112 in FIGS. 1, 3, 6, and 14, and which carries the fruit pulp slices to a packing station (not shown). At the packing station the skin-free fruit pulp slices are packed in suitable containers together with suitable syrup and then the containers are placed in a quick-freeze refrigeration cabinet (not shown) from which the containers are eventually shipped by refrigerated vehicles to various purchasers.

The manner in which the described apparatus operates to serve its purpose may be readily understood from the description to this point. Referring to FIG. 1, an operator stands adjacent the window 22 of the housing 20 at the receiving zone of the apparatus and manually transfers successive fruit F from the supply runway 24 to the successive receiving rings 40 on the rotating deck 38 where the fruit initially rest on the upper cutting ends of the corresponding rotating cylindrical knives 44. In the course of travel of the successive stations around the circumference of the carousel the plungers 36 operate as shown diagrammatically in FIG. 17 to force the fruit from the receiving rings onto the corresponding cylindrical knives 44 and then the plungers continue downward to push the axial cores 56 of the fruit beyond the lower ends of the cylindrical knives into the corresponding cages 45. The cutting action of the cylindrical knives 44 produces the skin-laden sleeves 55 which, as shown in FIG. 10, are split into cuffs 55a by the fixed knife blades 65. As heretofore explained and illustrated by FIG. 11, the cuffs 55 are expanded and released from the cylindrical knives 44 by the orbitally moving pins 74 and associated wings 75 in cooperation with the fixed blades 65. In a random manner the discarded split sleeves 55 reach an opening in the housing to fall onto the discard conveyor 80 that is shown in plan in FIG. 2.

As the slotted cages approach the oscillating knife assembly 82, the blades of the knife assembly enter the slots of the cages as shown in FIGS. 10 and 12 to divide each of the axial fruit cores 56 into a stack of slices which includes an upper skin-laden cap slice 58, a lower skin-laden cap slice 60 and four intermediate skin-free pulp slices 85. The upper skin-laden cap 58 rests on the uppermost blade of the knife assembly but is dislodged therefrom by abutment against the stationary curved finger 88 (FIG. 10) and as each cage approaches the leading edge 102 of the horizontal plate 100 the lower support means 90 under the cage is retracted by encountering the curved deflector 105 and the retraction of the lower support means permits the stack of four skin-free pulp slices 85 in the cage to drop onto and slide across the surface of the plate 100. In the meantime, the lower skin-laden cap 60 on the retracted lower support means 90 encounters the leading edge 102 of the plate 100 and is thereby dislodged from the lower support means 90. The discarded skin-laden caps 58 and 60 drop onto the chute 78 that leads to the previously mentioned discard conveyor 80.

As the stack of four skin-free pulp slices 85 in a travelling cage 45 slides across the surface of the fixed horizontal plate 100, the stack reaches the trailing edge 104 of the plate and drops onto the short conveyor 106 which carries the successive fruit pulp slices 85 to the discharge conveyor 112.

Structural Details

To rotate the carousel, FIG. 1 shows a motor 114 driving gearing in a gear box 115 which in turn drives a sprocket 116 that is rotatably mounted on the upright shaft 28. The sprocket 116 is releasably connected to the upright shaft by a clutch 118 which is operated by a lever 120 that is mounted on a fixed pivot 122. The free end of the lever 120 is connected by a link 124 to a manually operable control lever 125.

Figure 3:
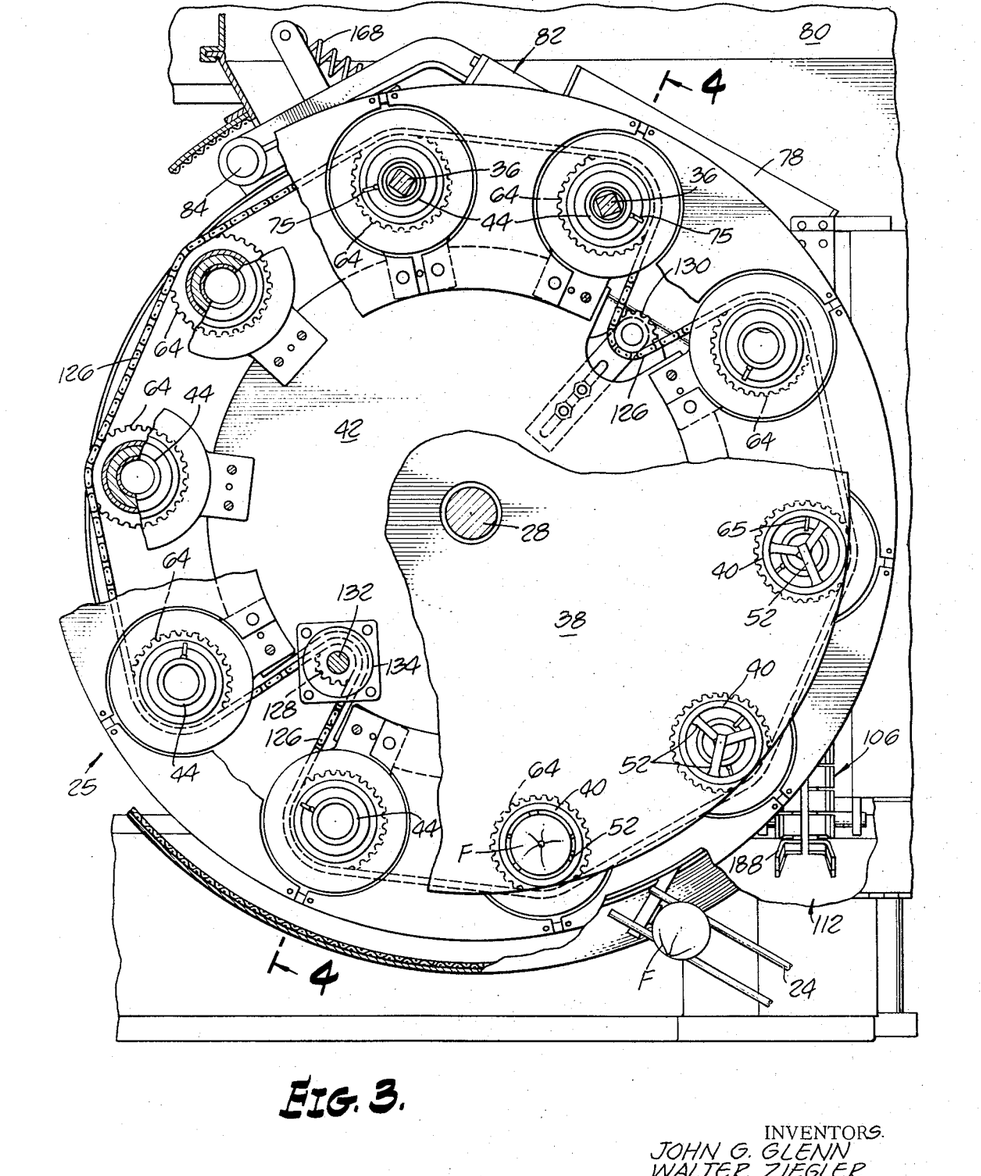
FIG. 3 is an enlarged horizontal section along the line 3—3 of FIG. 1 with parts broken away.

As shown in FIG. 3, the ten cylindrical knives 44 are driven by a continuous sprocket chain 126 that engages the ten sprockets 64 that are unitary with the ten cylindrical knives. The sprocket chain is actuated by a drive gear 128 and passes around an idler sprocket 130 that is adjustable to take up slack in the sprocket chain. The drive gear 128 is at the lower end of a drive shaft 132 which, as shown in FIG. 4, is journalled in both a lower thrust bearing 134 and an upper bearing 135 at the upper end of a support tube 136 on the uppermost deck 35.

A gear 138 on the upper end of the drive shaft 132 meshes with a gear 140 that is driven by a motor 142 through a gear box 144, the motor being mounted on a fixed bracket 145 in the upper region of the housing of the apparatus. The gear 140 functions as the sun gear that is concentric to the upright shaft 28 and the gear 138 functions as a planet gear travelling around the periphery of the sun gear. Thus, when the carousel is rotating and the sun gear 140 is actuated by the upper motor 142, the speed of rotation of the cylindrical knives 44 is the resultant of the rotation of the carousel and the rotation of the sun gear 140, the two rotations being additive.

For actuation of the ten plungers 36, a fixed cylinder 146 is mounted in the upper region of the housing and is provided with an outer circumferential cam track 148 that is formed by two spaced rails. Each of the plungers 36 is of square cross section and is guided longitudinally by two pairs of guide rollers 150 that are mounted on a corresponding bracket 152. The upper end of each plunger 36 carries a follower in the form of a roller 154 that rides in the cam track 148 so that the plunger rises and falls with changes in level of the cam track.

Figure 17:
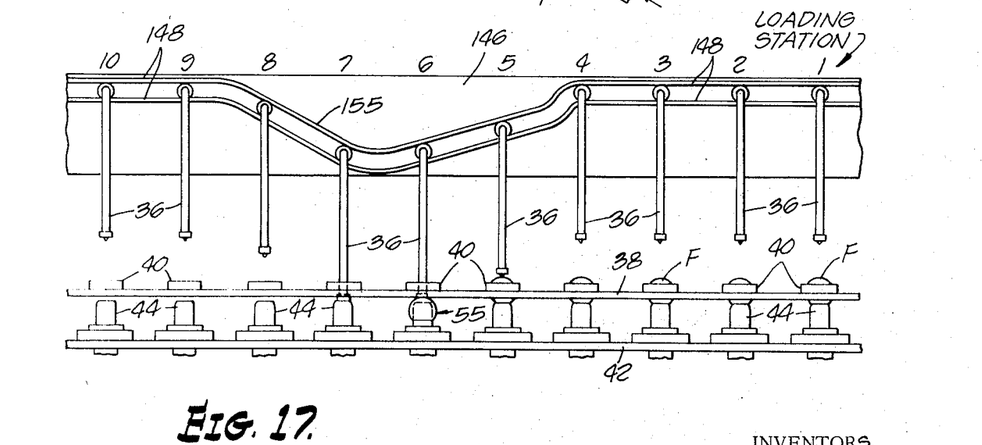
FIG. 17 is a developed schematic view showing how a cylindrical cam on the top deck actuates the various plungers that act upon the successive fruit.

The configuration of the cam track 148 is indicated in the developed view of FIG. 17 where it can be seen that the circumference of the cam track is divided into ten parts by the ten stations on the carousel. The cam track 148 is formed with a downward offset 155 that causes each plunger 36 in turn to move downward abruptly and return upward less abruptly.

As shown in FIG. 8, each receiving ring 40 is of reduced diameter in its lower portion to form an outer circumferential shoulder 156 to permit the receiving ring to seat in a circular aperture 158 in the deck 142. Each of the receiving rings 40 is made in two sections which are interconnected by screws 160, the two sections cooperating to clamp the outer ends of the flexible fingers 52.

To control the oscillations of the knife assembly 82 about the fixed pivot 84 to cooperate with the successive slotted cages 45 in synchronism with the rotation of the carousel, the carousel carries a concentric cam plate 162 below the lowermost deck 42 as shown in FIG. 4 and, as shown in FIGS. 6 and 16, the cam plate 162 is formed with ten equally spaced peripheral lobes 164 corresponding to the ten stations of the carousel. A suitable follower in the form of a roller 165 is mounted on an arm 166 at the outer end of the knife assembly and a suitable tension spring 168 continuously urges the knife assembly inwardly of the carousel to cause the follower 165 to maintain continuous contact with the peripheral cam surface of the cam plate 162. As shown in FIGS. 14 and 16, the arm 166 carries a bent sheet metal apron 170 which deflects the lower skin-laden cap slices 160 onto the chute 78 when the slices are dislodged from the pivoted lower support means 90.

Referring to FIGS. 12 and 16, the knife assembly 82 includes an elongated body 172 which has a pair of vertically spaced ears 174 at one end and similar laterally extending ears 175 at the other end. The five blades 86 of the knife assembly extend longitudinally between the two pairs of ears. Between the two ears 174 at one end of the knife assembly, the knife blades 86 are separated by a stack of spacer blocks 176 which are held together by a vertical bolt 178. A pair of dowels 180 extend through the stack of spacer blocks 176 and also through the ends of the blades 86 to serve as means for connecting the ends of the blades to the bolt 178.

At the other ends of the blades, the blades are individually connected by short pins 182 to individual spacer blocks 184 that are stacked between the two ears 175. For the purpose of placing the blades 86 individually under tension, a heavy bar 185 is mounted in the body 172 beyond the pair of ears 175 and adjustable tension screws 186 connect the individual spacer blocks 184 to the heavy bar, the screws serving to adjust the tension of the individual blades 86.

The structure of the previously mentioned short conveyor 106 may be understood by referring to FIGS. 6, 14, and 15. The short conveyor 106 has a longitudinal series of receptacles 188 of angular sheet metal, each receptacle being divided into two spaced sections mounted on two corresponding sprocket chains 190. The two sprocket chains 190 are mounted on corresponding pairs of sprockets 192 at opposite ends of the conveyor, which pairs of sprockets are mounted on corresponding shafts 194. As indicated in dotted lines in FIG. 1, a suitable motor 195 drives one of the two shafts 194 by means of a pair of pulleys 196 and 198 and the same motor acting through a pair of gears 200 drives a stub shaft 202 on which the previously mentioned disc-shaped blade 110 may be mounted if it is desired to bisect the fruit pulp slices 85 on the short conveyor. The short conveyor 106 operates at a sufficiently high speed to cause the fruit pulp slices 85 to be distributed along the receptacles 188 in the general manner shown in FIG. 6.

The discharge conveyor 112 that receives the fruit pulp slices 85 from the short conveyor 106 is shown in side elevation in FIG. 1. The discharge conveyor which is driven by a suitable motor (not shown) has a continuous conveyor belt 204 mounted on suitable rollers including rollers 205.

The description in specific detail of the presently preferred embodiment of the invention will suggest various changes, substitutions, and other departures from the disclosure within the spirit and scope of the appended claims.

We claim:

1. In an apparatus of the character described to cut slices of fruit, for example slices of oranges, the combination of:

an upright cylindrical knife;

a cage below the cylindrical knife to receive a fruit pulp core;

reciprocable plunger means movable downwardly to force the fruit axially onto the cylindrical knife from above to divide the fruit into an outer skin-laden sleeve and an inner axial pulp core having skin-laden opposite ends, and to force the axial pulp core from the interior of the cylindrical knife into the cage;

knife means movable into and out of the cage to cut the axial pulp core into a stack of slices including skin-laden caps at opposite ends of the core and intermediate skin-free fruit slices;

means below the cage to support the axial pulp core before the cutting operation by the knife means and to support the stack of slices after the cutting operation, said support means being movable to permit the fruit slices to drop out of the bottom of the cage;

means to remove each of the opposite skin-laden caps from the stack of slices before the fruit slices drop out of the cage; and conveyor means under the support means to receive the fruit slices from the cage, said conveyor means travelling transversely of the cage at a rate to cause the slices of the stack to be distributed in a row across the conveyor.

2. In an apparatus of the character described to cut slices of fruit, for example slices of oranges, the combination of:

a plurality of assemblies, each comprising:
an upright cylindrical knife;
a cage below the knife;
plunger means to force a fruit axially onto the upper end of the cylindrical knife to divide the fruit into an outer skin-laden sleeve and an inner axial pulp core having skin-laden opposite ends, and to force the axial pulp core from the interior of the cylindrical knife downward into said cage;

means to move said assemblies in a substantially horizontal closed path through a receiving zone and a cutting zone to a discharge zone;
knife means at said cutting zone movable into and out of the cages to cut the axial pulp cores therein into stacks of slices including skin-laden caps at opposite ends of the stacks and intermediate skin-free fruit slices;
means below the cages to support the axial pulp cores before the cutting operations by the knife means and to support the stacks of slices after the cutting operations, said support means being operable to permit the fruit slices to drop out of the bottoms of the cages at said discharge station;
means to remove each of the opposite skin-laden caps from the stacks of slices; and
conveyor means below said closed path at said discharge zone to receive the fruit slices from the successive cages, said conveyor means travelling transversely of the cages at a rate to cause the slices of the stacks to be distributed in a row across the conveyor.

3. A combination as set forth in claim 2 in which the means to move the assemblies in a closed path comprises a rotary carousel;
and which includes means to reciprocate said plunger means in response to rotation of the carousel.

4. A combination as set forth in claim 3 in which said support means for the pulp in the cages is operable by rotation of the carousel to release the fruit slices from the cages.

5. In an apparatus for cutting slices of fruit, for example, slices of oranges, the combination comprising:
a tubular cylindrical knife arranged with its axis generally vertical;
a generally tubular open ended cage below said knife;

a plunger reciprocally mounted above said knife for downward movement therethrough to said cage to force a fruit over said knife and divide the same into an outer skin-laden sleeve and an inner axial pulp core having skin-laden opposite ends, and to force the axial pulp core from the interior of the cylindrical knife into said cage;
an assembly of laterally movable parallel blades movable into and out of the cage to cut the axial pulp core into a stack of slices including skin-laden caps at opposite ends of the core and intermediate skin-free fruit slices;
means to remove each of the opposite skin-laden caps from the stack of slices before the fruit slices drop out of the cage; and
said last-named means including support means at the lower end of said cage to support the pulp core in the cage during the slicing operation by said blades, said support means being retractable from under said cage to permit fruit slices to gravitate therefrom.

6. The combination defined in claim 5 wherein said means for removing said caps includes an uppermost knife blade movable over the top of said cage whereby to sever the upper skin-laden cap from said core and support said cap for removal from said stack by outward movement of said blades, and means for dislodging said cap from said uppermost blade.

7. In an apparatus of the character described to cut slices of fruit, for example slices of oranges, the combination of:
a cylindrical knife;
a cage to receive a fruit core;
plunger means to force a fruit axially onto the cylindrical knife to divide the fruit into an outer skin-laden sleeve and an inner axial pulp core having skin-laden opposite ends, and to force the axial pulp core from the interior of the cylindrical knife into said cage;
an assembly of parallel blades movable into and out of the cage to cut the axial pulp core into a stack of slices including skin-laden caps at opposite ends of the core and intermediate skin-free fruit slices;

means to separate the intermediate skin-free fruit slices from the stack of slices;
said cage being upright and including lower support means normally positioned at the lower end of the cage to support the axial pulp core in the cage prior to the slicing operation,
said support means being retractable out of alignment with the cage to permit fruit slices to gravitate out of the cage;
fixed means near the level of the lower end of the cage presenting a support surface, said fixed means having a trailing edge;
means to cause relative movement between the cage and the fixed means to cause the stack of intermediate slices in the cage to slide across said support surface and to drop out of the cage beyond said trailing edge; and
means to retract said lower support means out of alignment with the stack of intermediate fruit slices as the cage approaches said support surface thereby to retract the lower skin-laden cap from the cage and to permit the weight of the stack of intermediate slices to be shifted to said fixed support surface.

8. A combination as set forth in claim 7 which includes means to dislodge the lower skin-laden cap from the retracted lower support means.

9. A combination as set forth in claim 8 in which said fixed means has a leading edge and in which said leading edge dislodges the lower skin-laden cap from the retracted lower support means.

10. A combination as set forth in claim 5 which includes means to bisect the intermediate fruit slices after the intermediate fruit slices are separated from the skin-laden caps.

11. A combination as set forth in claim 10 which includes a conveyor to receive the intermediate fruit slices released from the cage;
and in which said bisecting means is a rotary disc-shaped blade having its plane of rotation aligned with the direction of travel of the conveyor.

12. A combination as set forth in claim 5 which includes means to split said skin-laden sleeve to facilitate removal of the sleeve from the cylindrical knife.

13. A combination as set forth in claim 5 which includes a fixed blade positioned radially outwardly of the periphery of the cylindrical knife to split said skin-laden sleeve as the fruit advances onto the cylindrical knife.

14. A combination as set forth in claim 13 which includes means to rotate the cylindrical knife on its axis.

15. A combination as set forth in claim 13 which includes means moving orbitally about the rotary cylindrical knife to engage a longitudinal edge of the split skin-laden sleeve to cooperate with the fixed blade to force the split skin-laden sleeve free from the cylindrical knife.

16. In an apparatus of the character described to cut slices of fruit, for example from oranges, the combination of:
an upright rotary support structure having a series of circumferentially spaced operating stations;
power means to rotate the support structure on its axis past a loading zone and past a discharge zone adjacent the periphery of the support structure;
a cylindrical knife at each of said stations;
a cage at each of said stations on the support structure aligned with the corresponding cylindrical knife, said cage having a passage in alignment with the cylindrical knife;
plunger means at each of said stations movable from a retracted position through the interior of the cylindrical knife to function, first, to cause the cylindrical knife to divide a fruit into a skin-laden outer sleeve and an inner axial pulp core with skin-laden caps at the opposite ends of the core, and second, to force the axial core from the cylindrical knife into the passage of the cage;
cutting means movable into and out of each of the cages to cut each axial core into a stack of fruit slices including skin-laden slices at opposite ends of the core, and a stack of intermediate skin-free slices; and
means to separate said intermediate fruit slices from each of the stacks and to release the intermediate fruit slices at said discharge zone.

17. A combination as set forth in claim 16 which includes a fixed cam positioned coaxially of the rotary support structure to reciprocate said plungers in response to rotation of the support structure.

18. A combination as set forth in claim 16 in which said cutting means comprises an assembly of parallel knife blades adjacent the periphery of the rotary support structure and means to advance and retract the assembly relative to the successive cages in synchronism with the rotation of the support structure.

19. A combination as set forth in claim 18 in which the means to advance and retract the assembly includes a cam carried by the rotary support structure with lobes of the cam spaced circumferentially of the rotary support structure.

20. A combination as set forth in claim 19 in which said assembly is mounted on a fixed pivot adjacent the rotary support structure;
in which the assembly is equipped with follower means to cooperate with the lobes of said cam;
and in which the assembly is biased towards the cam.

21. A combination as set forth in claim 16 which includes ring means at each of said stations to retain a newly received fruit with the fruit resting on the upper cutting end of the corresponding cylindrical knife.

22. A combination as set forth in claim 21 in which said ring means includes a plurality of resilient yieldable elements at its inner circumference to contact the fruit and to tend to center the fruit relative to the cylindrical knife.

23. A combination as set forth in claim 16 which includes actuating means to rotate said cylindrical knives about their axes, said actuating means comprising:
a sun gear position coaxially of the rotary support structure;
a planet gear rotatably mounted on the support structure in mesh with the sun gear to travel around the sun gear in response to rotation of the support structure; and
means operatively connecting the planet gear to each of the cylindrical knives.

24. A combination as set forth in claim 23 which includes power means to rotate the sun gear so that the rotation of the planet gear is the resultant of the rotation of the sun gear and the rotation of the support structure.

25. A combination as set forth in claim 16
in which said support structure has three operating levels, namely, a receiving level equipped with means to receive successive fruit to be processed, a lower level equipped with the cylindrical knives, and a still lower slicing level equipped with said cages.

26. A combination as set forth in claim 16 which includes fixed means at said discharge zone, said fixed means having a leading edge, an upper surface and a trailing edge, said fixed means being positioned adjacent the circular path of travel of the cages to slidingly support said intermediate slices in the cages and to release the slices from the cages at the trailing edge of the fixed means.

27. A combination as set forth in claim 26 in which the leading edge of the stationary means is positioned to dislodge and discard the lower skin-laden fruit slices.

28. A combination as set forth in claim 16 in which the plunger means is operated by rotation of the support structure.

29. A combination as set forth in claim 16 in which the cutting means is operated by rotation of the support structure.

30. A combination as set forth in claim 16 which includes fixed means adjacent the rotary support structure for abutment by the skin-laden caps to discard the caps.

* * * * *